March 30, 1954  W. G. CALDER  2,673,383
TIGHTENING DEVICE
Filed Sept. 5, 1950
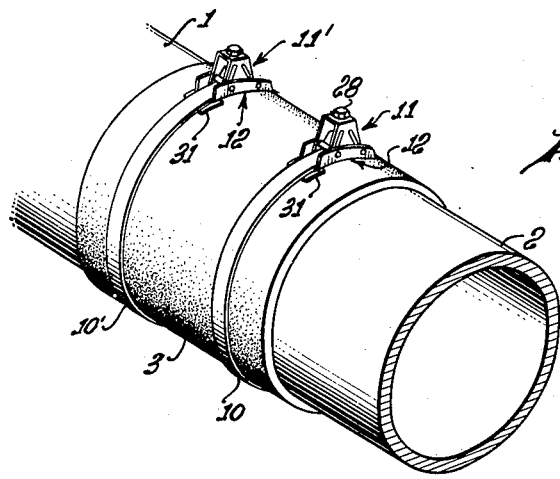
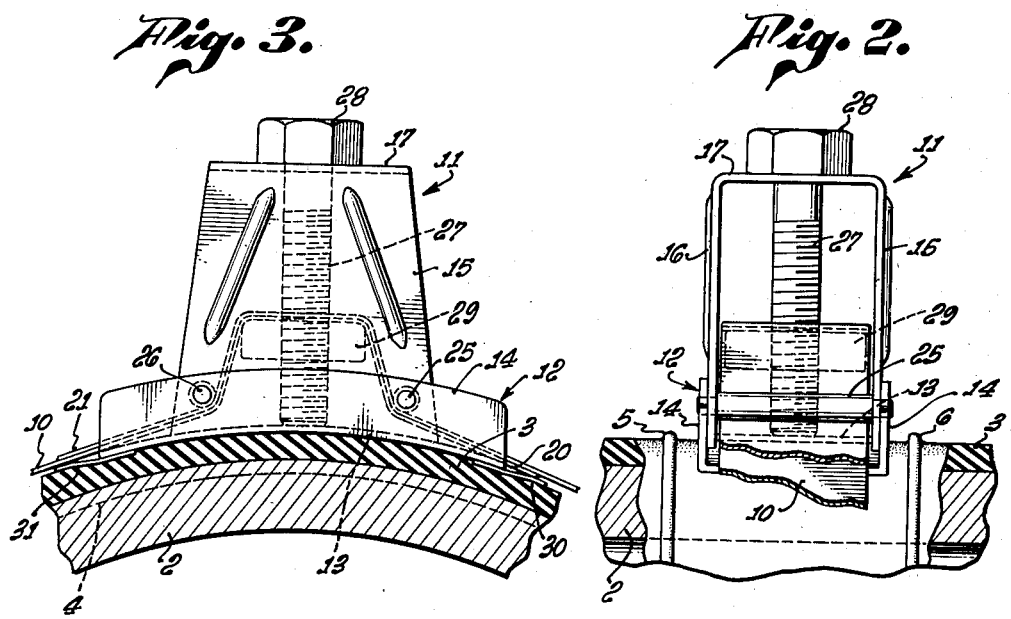
WILLIAM G. CALDER,
INVENTOR.
BY
ATTORNEY.

Patented Mar. 30, 1954

2,673,383

UNITED STATES PATENT OFFICE 2,673,383

TIGHTENING DEVICE

William G. Calder, Los Angeles, Calif., assignor to Joints, Inc., Los Angeles, Calif., a corporation of California Application September 5, 1950, Serial No. 183,105

2 Claims. (Cl. 24—278)

This invention is directed to improvements in pipe couplings and is particularly directed to devices whereby encircling bands may be readily tightened around pipe joints or wherever it is desired to place an encircling band around an object. Although the primary purpose of the invention is to disclose improvements in pipe couplings, the invention is not limited thereto.

Heretofore metallic, ribbon-like bands have been placed around sleeves which in turn received the ends of adjacent sections of pipe, the ribbon-like bands being tightened (placed under tension) and thereby causing the sleeve to tightly enclose the end of the pipe and form a suitable liquid-tight connection between adjacent lengths of pipe. Band-tightening devices of various kinds have been provided heretofore but all of them have disadvantages. Some devices are extremely bulky and heavy and thereby add to the weight of overhead pipe lines and entail considerable expense. Others do not place the band under uniform tension and an unequal application of tension very often has a tendency to crack the pipe, particularly when the pipe is made of a ceramic material such as vitrified clay or glass. Still other tightening devices do not distribute the load uniformly and in many instances the tightening device fails or breaks during usage.

The present invention includes a band-tightening device which avoids difficulties encountered in prior devices, is simply constructed and positive in operation.

Generally stated, the band-tightening device of the present invention includes a saddle provided with a base including a lower surface contoured to the shape of the pipe or other article to which the band is to be applied. Supported upon such base is a yoke, said yoke carrying a band-tightening means. The band-tightening means is protected by the yoke and extends beneath a band to be applied to the article. Upward tension is applied to the band by the tightening device and the resultant thrust or force is transmitted by the yoke to the saddle, the saddle distributing the load over a considerable area, thereby preventing localized stress in the pipe. Means are also provided whereby shifting of the yoke on the saddle is minimized.

It is an object of the present invention, therefore, to disclose and provide an improved pipe coupling or joint particularly adapted for connecting opposing ends of adjacent sections of ceramic, relatively fragile and frangible pipe.

Another object of the invention is to disclose and provide an improved simple, economical and positive band-tightening device.

These and other objects, uses and advantages of the invention will become apparent from the following description, reference being had, for purposes of illustration and description, to the appended drawings in which:

Fig. 1 is a perspective view of a coupling connecting two adjacent pipe sections, said coupling being provided with the device of the present invention.

Fig. 2 is an end elevation of one of the said devices.

Fig. 3 is a side view of the device shown in Fig. 2.

Fig. 4 is a side view of a slightly modified form of device.

In Fig. 1 opposing end portions of pipe sections 1 and 2 are shown received within a coupling sleeve or collar 3, this coupling collar being made of any suitable composition, preferably somewhat resilient. Rubber compositions, impregnated fiber compositions, etc. are exemplary. The coupling element 3 carries two or more clamping bands such as the bands 10 and 10'. When two bands are employed, each band embraces the coupling some distance away from the end of the pipe section contained within the coupling element 3. Each band is provided with a band-tightening device such as the devices 11 and 11', whereby the tension in the respective bands cooperating with such tightening devices may be controllably adjusted.

By referring to Figs. 2 and 3 it will be noted that the coupling element 3 may be provided with an inwardly extending flange 4, such flange extending between the opposing ends of the adjacent pipe sections 1 and 2. The outer surface of the coupling 3 may also be provided with upstanding ribs, such as 5 and 6, for the purpose of properly positioning the band upon the coupling.

Each of the band-tightening devices comprises a saddle, generally indicated at 12, having a base 13, the lower surface of such base being contoured to the curvature of the pipe, coupling or other object around which the band is to be applied. Each such device is also provided with a yoke or yoke frame and in the examples given such yoke includes the sides 15—16 having lower edges adapted to rest upon the base 13 of the saddle, and an integral head 17 which carries the tightening means.

The saddle 12 may include upstanding side flanges 14 and means may be provided for restricting the movement of the yoke upon the saddle. In Figs. 2 and 3 such means comprise pins 25 and 26 having reduced ends extending through aligned ports in the flanges 14 and side walls 15 and 16, such pins being spaced from each other and also spaced from the base 13 of the saddle. The reduced ends of each of the pins 25 and 26 may be freely rotatable in the corresponding aligned ports, or a central portion of each pin, as between the side walls 15 and 16 of the yoke, may be provided with an external rotatable sleeve. In this manner the pins 25 and 26 position the yoke upon the saddle and at the same time act as guides for the band which extends around the coupling beneath the rollers and between the side walls of the yoke.

Each of the bands such as the band 10 is preferably a continuous strip of metal longer than the circumference of the coupling so as to provide an overlapping section in the region of the tightening device. As best shown in Fig. 3, one end of the band 10, indicated at 20, is preferably spot-welded to the body of the band and extends beyond the tightening means on one side thereof, whereas the other end of the band, indicated at 21, is spot-welded or otherwise connected to the body of the band on the opposite side of the tightening means. A double layer of band thereby passes beneath the pins 25 and 26 and through the tightening device. This doubled portion of the band is ported or perforated so as to permit the shank 27 of a bolt having head 28 supported upon the head 17 of the yoke to extend through the port in the doubled band 10 and threadedly receive thereunder a follower nut indicated at 29. This follower nut preferably has rounded upper edges so as to prevent cutting into the band. It may be also noted that the shank of the tightening bolt is sufficiently long so as to leave but little clearance between the end of such shank or shaft and the base 13 of the saddle when the device is assembled.

The operation of the device can be readily appreciated from an inspection of the drawings. By placing the loose band upon the coupling 3 and then rotating the bolt (by engagement of the head 28 with any suitable tool) the follower nut 29, being prevented from rotation by contact with the band and by reason of but minor clearance between the nut and sides 15 and 16 of the yoke, will tend to raise the doubled portion of the band 10, thereby placing the band under tension. The pins 25 and 26 are spaced a distance slightly greater than the width of the follower nut 29. The upward tightening force which is thus applied to the band is translated to a downward component through the yoke onto the saddle. The saddle in turn distributes the load over the entire base 13 thereof. In some instances, in order to prevent the edges of the saddle from cutting into the coupling 3, distribution plates 30 and 31, of relatively thin, resilient metal, may be introduced beneath the ends of the saddle for the purpose of distributing the load over a greater area and in a more gradual manner.

The construction of the device completely enhouses the follower nut. Since the head 28 of the tightening bolt rests against the head 17 of the yoke, there is no tendency for the shank of the bolt to deviate from a position perpendicular to the head 17, with the axis of such shank midway between the pins 25 and 26. As a result, the tension imparted to the band is equally imparted both to the right and left of the tightening device.

The modification illustrated in Fig. 4 shows a yoke provided with a furcated lower end including the port or bay 35 formed in each of the sides of the yoke, only one side 15' being shown. The upstanding flange 14' of the saddle is lanced and bent inwardly so as to form a finger 36 extending into the port or bay 35 of the yoke. Shifting of the yoke upon the saddle is thus limited by interengagement of the lug 36 with the edges of the bay 35. The pins 25' and 26' do not extend into the flanges 14' of the saddle but instead are carried entirely by the side walls of the yoke. In other respects the device is similar to that described in detail in Figs. 2 and 3.

It may be noted that no excessive load is carried by the pins 25 and 26, 25' and 26' since the downward tightening thrust or resultant is transmitted directly by the side walls of the yoke onto the saddle.

All changes and modifications coming within the scope of the appended claims are embraced thereby.

I claim:

1. A band-tightening device comprising: a saddle having an elongated base provided with a lower surface curved to virtually the curvature of the object to which the band is to be applied and having side flanges; a separable unitary yoke frame supported by the saddle, said yoke having spaced side members with downwardly facing edges resting upon longitudinal side margins of the base and an integral head connecting said side members; a pair of spaced, transverse pins connecting the lower portions of the yoke side members and extending into said side flanges on said saddle, said pins being spaced from the base of the saddle to allow a band to pass between the pins and base; and tightening means carried by the head of the yoke and extending between said pins into cooperative engagement with a band.

2. A band-tightening device comprising: an elongated saddle having a base provided with a lower surface curved to virtually the curvature of the object to which a band is to be applied and provided with upstanding side flanges; a separable unitary open-ended yoke frame supported by the saddle, said yoke frame having spaced side members with concave downwardly directed edge faces bearing upon side margins of the saddle and an integral head connecting said side members; a pair of spaced transverse pins connecting the lower portions of the yoke side members and rotatably mounted in said yoke side members and extending into said side flanges on the saddle, said pins being spaced from the base of the saddle to allow a band to pass between the pins and base; and tightening means carried by the yoke and between the side members thereof and arranged to exert upward tightening force to a band and to translate said force into a downward component bearing against the saddle.

WILLIAM G. CALDER.

References Cited in the file of this patent

UNITED STATES PATENTS

| Number | Name | Date |
| --- | --- | --- |
| 351,263 | Hemphill | Oct. 19, 1886 |
| 1,160,284 | Headly | Mar. 16, 1915 |
| 1,413,003 | Chaloupka | Apr. 18, 1922 |
| 1,442,909 | Ryan | Jan. 23, 1923 |
| 1,952,863 | Hueber | Mar. 27, 1934 |
| 1,978,646 | Oishei et al. | Oct. 30, 1934 |
| 2,165,920 | Burnip | July 11, 1939 |

FOREIGN PATENTS

| Number | Country | Date |
| --- | --- | --- |
| 892,429 | France | Jan. 7, 1944 |